US012687680B2

(12) United States Patent
Macoin et al.

(10) Patent No.: US 12,687,680 B2
(45) Date of Patent: Jul. 21, 2026

(54) ADAPTER FOR A FIBER-OPTIC PLUG

(71) Applicant: CORNING RESEARCH & DEVELOPMENT CORPORATION, Corning, NY (US)

(72) Inventors: Aurélien Julien Alexandre Macoin, Nantes (FR); Gordon Mueller-Schlomka, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 232 days.

(21) Appl. No.: 18/384,453

(22) Filed: Oct. 27, 2023

(65) Prior Publication Data

US 2024/0142712 A1     May 2, 2024

Related U.S. Application Data

(60) Provisional application No. 63/421,322, filed on Nov. 1, 2022.

(51) Int. Cl.
G02B 6/38          (2006.01)
(52) U.S. Cl.
CPC ......... G02B 6/3825 (2013.01); G02B 6/3831 (2013.01); G02B 6/3893 (2013.01)
(58) Field of Classification Search
None
See application file for complete search history.

(56) References Cited

U.S. PATENT DOCUMENTS

| | | | |
|---|---|---|---|
| 8,152,386 B2 | 4/2012 | Luther et al. | |
| 11,880,076 B2 | 1/2024 | Barthes et al. | |
| 2004/0052472 A1* | 3/2004 | Roth .................... | G02B 6/3885 |
| | | | 385/59 |
| 2008/0112672 A1* | 5/2008 | Lewallen ............ | G02B 6/3831 |
| | | | 385/56 |

(Continued)

OTHER PUBLICATIONS

Extended European Search Report, 23206725.6, dated Mar. 12, 2024, 8 pages, European patent office.

*Primary Examiner* — Jerry Rahll
(74) *Attorney, Agent, or Firm* — Tamika A. Crawl-Bey

(57)          ABSTRACT
An adapter for a fiber-optic plug is disclosed, the adapter configured to be received in a port of a fiber-optic apparatus, the adapter comprising: a first opening proximate a first end of the adapter, the first opening configured to receive a multifiber fiber optic connector; a second opening proximate a second end of the adapter, the second opening configured to receive a hardened multifiber connector; an adapter body extending longitudinally between the first end of the adapter and the second end of the adapter and defining an internal cavity therethrough, the adapter body comprising: a first engagement mechanism at the first end of the adapter for engaging with the port of the fiber-optic apparatus; a second engagement mechanism between the first end of the adapter and the second end of the adapter for engaging with the multifiber fiber optic connector; a third engagement mechanism at the second end of the adapter for engaging with a hardened multifiber connector; a locating feature for locating the hardened multifiber connector in the adapter; and an alignment mechanism for aligning the adapter with the fiber-optic apparatus.

16 Claims, 5 Drawing Sheets

(56)         References Cited

U.S. PATENT DOCUMENTS

| | | |
|---|---|---|
| 2008/0175542 A1* | 7/2008 | Lu ........................ G02B 6/3869 |
| | | 385/62 |
| 2008/0226235 A1 | 9/2008 | Luther et al. |
| 2014/0241688 A1* | 8/2014 | Isenhour ............ G02B 6/44526 |
| | | 29/428 |
| 2016/0209599 A1 | 7/2016 | Van et al. |
| 2017/0102507 A1* | 4/2017 | Menguy ............. G02B 6/38875 |
| 2019/0324217 A1* | 10/2019 | Lu ........................ G02B 6/3879 |
| 2020/0249403 A1 | 8/2020 | Dowling |

* cited by examiner

ADAPTER FOR A FIBER-OPTIC PLUG

PRIORITY APPLICATION

This application claims the benefit of priority of U.S. Provisional Application Ser. No. 63/421,322 filed on Nov. 1, 2022, the content of which is relied upon and incorporated herein by reference in its entirety.

FIELD

The present disclosure relates to the field of optical hardware and fiber-optic apparatuses. In particular, the technology of the disclosure relates to assemblies for interconnecting or otherwise terminating optical fibers and, more particularly, to adapters for mating multifiber fiber-optic connectors with fiber-optic apparatuses.

BACKGROUND

Fiber-optic networks allow information to be transmitted via optical signals transmitted through optical fibers. Compared with traditional copper wiring, optical fibers allow transmission over greater distances with substantially less signal loss, provide a greater bandwidth, and do not suffer from electrical interference. Fiber-optic networks are particularly useful when providing long-distance communication and high bandwidth, so called "super-fast", broadband internet.

Typically, in a fiber-optic network a fiber optic cable is run from the network operator to a consumer premises (an outside plant, or OSP, cable). At the consumer premises, this cable is then split into a number of separate fiber-optic cables, each providing network connections (inside plant, or ISP cables). Typically, this is done using a fiber-optic splitter, also known as an optical splitter or beam splitter.

The outputs of the beam splitters are typically for supplying individual consumer premises. For example, in this manner a fiber-optic broadband provider may lay a single fiber-optic cable to service a group of houses or business on a road or to service a block of apartments. This cable may terminate in a street cabinet or wall terminal where the cable is split into a number of consumer fibers for servicing each individual house, business or apartment.

To provide flexibility, for example because the number of premises subscribed to the fiber-optic broadband provider may change, the output fibers of the beam splitter are usually connected to the consumer fibers via fiber-optic connectors or connector adapters. Many standard connector types exist, such as SC, LC, and MPO connectors. These connections also occur within a fiber-optic closure such as a street cabinet or wall terminal, and allow an engineer to quickly connect or disconnect individual consumer fibers with the fiber-optic network.

These fiber-optic closures typically include one or more ports in which the individual optical fibers of a fiber-optic cable that extends outside of the closure are connected to respective optical fibers within the closure. The optical fibers within the closure can then be interconnected or otherwise terminated as desired. Each side of a port of a fiber-optic closure is typically designed to receive only one type of fiber-optic connector. In order to mate with an outer side of a port of the closure, a fiber-optic plug type connector is typically mounted to the end of the incoming fiber-optic cable. The optical fibers within the closure typically extend from a cable or other fiber housing that extends into or is located inside the closure to facilitate splicing or other interconnection or termination of the optical fibers. A further connector is typically mounted to the end of the cable or other fibers that are housed within the closure to mate to the inner side of the port. Conventionally, ports include a port housing defining alignment features for grossly aligning the two connectors to be mated. The port is designed to receive a pair of ferrules, each of which is mounted upon the end portions of a plurality of optical fibers. The ferrules enable precise alignment and optical connection of the optical fibers. One of the ferrules is attached to the end of optical fibers located inside the closure. The other ferrule is mounted upon the optical fibers of the fiber-optic cable that extends outside of the closure. The ferrules may have ferrule guide pins or other alignment means which enable precise alignment of the optical fibers mounted on the end faces of each ferrule.

While adapters that connect connectors of the same type are generally well known, adapters for dissimilar connectors typically require a more complex design. These adapters for dissimilar connectors should protect the mating connectors and optical fibers from adverse environmental and mechanical influences, such as from side loading, rotational and tensile forces. These external influences can disadvantageously increase the attenuation of the optical signals transmitted via the optical fibers in a cable inserted in a port of a closure. If external forces are sufficiently strong, the optical fibers may even be broken. Traditionally, the fiber optic cables upon which the fiber optic plugs are mounted have been quite flexible such that the plug ferrule has been subjected to only minimal amounts of torque. More recently, however, fiber optic plugs are being installed upon fiber optic cables that are much stiffer, such as the armored fiber optic cables designed for outdoor applications. As a result of the increased stiffness of these fiber optic cables, forces upon the fiber optic cable are much more readily transmitted to the plug ferrule, thereby imposing increased torque upon the plug ferrule.

In would therefore be desirable to provide an adapter for a port of a fiber optic closure that allows a different type of connector to be received in the port of the closure to the type of connector the port is designed to receive. It would also be desirable to provide an adapter that enables proper alignment of dissimilar connectors with an optically stable connection, whilst mitigating external influences in order reduce or eliminate connector interference problems.

SUMMARY OF INVENTION

According to a first aspect, an adapter for a fiber-optic plug is provided, the adapter is configured to be received in a port of a fiber-optic apparatus. The adapter comprises: a first opening proximate a first end of the adapter, the first opening configured to receive a multifiber fiber optic connector; a second opening proximate a second end of the adapter, the second opening configured to receive a hardened multifiber connector; an adapter body extending longitudinally between the first end of the adapter and the second end of the adapter and defining an internal cavity therethrough, the adapter body comprising: a first engagement mechanism at the first end of the adapter for engaging with the port of the fiber-optic apparatus; a second engagement mechanism between the first end of the adapter and the second end of the adapter for engaging with the multifiber fiber optic connector; a third engagement mechanism at the second end of the adapter for engaging with a hardened multifiber connector; a locating feature for locating the hardened multifiber connector in the adapter; and an alignment mechanism for aligning the adapter with the fiber-optic apparatus.

This provides an adapter that allows dissimilar connectors to be received in a port of a fiber-optic apparatus. In other words, the adapter enables a connector of a first type to be received in one side of the port of a fiber-optic apparatus and a connector of a second type, different to the first type, to be received in a second port of a fiber-optic apparatus. The connector of the first type may be a multifiber fiber-optic connector. The connector of the second type may be a hardened multifiber connector. The adapter enables the engagement and mating of two dissimilar connectors to form a stable fiber-optic connection. In particular, the first engagement mechanism, the second engagement mechanism, the locating feature and the alignment mechanism enable the engagement, and mating, of the two dissimilar connectors. In more detail, the first engagement mechanism provides secure engagement between the adapter and the port of the fiber-optic apparatus. The first engagement mechanism may also provide accurate location of the adapter relative to the fiber-optic apparatus. The second engagement mechanism provides secure engagement between the adapter and the multifiber-fiber-optic connector. The second engagement mechanism may also provide accurate location of the adapter relative to the multifiber fiber-optic connector. The third engagement mechanism provides secure engagement between the adapter and the hardened multifiber connector. The third engagement mechanism may also provide accurate location of the adapter relative to the hardened multifiber connector. The locating feature provides further location between the adapter and the hardened multifiber connector. The alignment mechanism provides a means for aligning the adapter and the fiber-optic apparatus. This, in turn, facilitates the proper alignment and mating of the ferrules of dissimilar connectors. The adapter, and in particular the secure engagement between the adapter and the connectors, also advantageously mitigates external influences in order reduce or eliminate connector interference problems. The external influences may include but are not limited to side loading, rotational forces and tensile forces. The mitigation of these external influences also helps to protect the delicate fiber optic components housed in each of the dissimilar connectors, such as the optical fibers and ferrules housed in the connectors. The adapter has the further advantage of modifying the port of a fiber-optic apparatus to allow the port to receive types of connectors that the port of the apparatus is not designed to receive. Therefore, the adapter provides a cost effective and environmentally friendly solution to modifying a fiber-optic apparatus to receive new or alternative types of fiber-optic connectors to the connectors it is designed to receive as it prevents the need to replace the entire fiber-optic apparatus.

Optionally, the adapter is configured to be received in the port of the fiber-optic closure.

The adapter may therefore have the advantage of modifying the port of the fiber-optic closure to allow the port to receive types of connectors that the port of the closure is not designed to receive. Therefore, the adapter provides a cost effective solution to modifying a fiber-optic apparatus to receive new or alternative types of fiber-optic connectors as it prevents the need to replace the entire fiber-optic apparatus. The adapter may be configured to be received only partially in the port of the fiber-optic apparatus. The adapter may be configured to be fully received in the port of the apparatus with the exception of the first engagement mechanism. Alternatively, the adapter may be configured to be fully received in the port of the fiber-optic apparatus.

Optionally, the adapter is configured to be received in a hexagonal port of a fiber-optic closure.

The hexagonal shape of the port may refer to the cross section of the opening of the port. The adapter may have a second opening which has a different shape to the hexagonal shape of the port. This may advantageously allow a fiber optic connector with an outer profile which is not hexagonal to be received in the port of the fiber-optic closure. By way of example only, the second opening of the adapter may have a circular or rectangular opening.

Optionally, the adapter is configured to be received in a port of a BPEO (boite protection environmental optique) closure.

BPEO closures typically have hexagonal ports, therefore, this arrangement has the advantage of allowing a fiber optic connector with an outer profile which is not hexagonal to be received in the port of the fiber-optic closure. BPEO closures are a well-known type of closure and are widely sold. Thus, this arrangement advantageously eliminates the need to replace the BPEO closures already in use. Therefore, the adapter provides a more cost effective and environmentally friendly solution which does not require the replacement and reconnection of BPEO closures already in use. The adapter may be configured to be received in a size 0, size 1, size 1.5, size 2 and/or size 3 BPEO closure.

Optionally, the first engagement mechanism is a snap fit engagement mechanism.

Where the first engagement mechanism is a snap fit engagement mechanism, the adapter may be configured to snap into position in a port of a fiber-optic apparatus such that the adapter is engaged with the port. The snap fit engagement mechanism may operate by way of snaps and corresponding features for engaging with the snaps. Such a snap fit engagement mechanism may advantageously provide a mechanism which can be engaged and disengaged by an operator working on an apparatus without the need for any specific tooling. This can facilitate access for an operator carrying out routine maintenance on the apparatus or the optical fibers housed within either of the connectors and/or within the fiber-optic apparatus. The snap fit engagement mechanism may also provide accurate axial location of the adapter relative to the apparatus along an axis passing through the center of the internal cavity in the adapter. The snap fit mechanism may also provide accurate longitudinal location of the adapter relative to the apparatus. The snap fit engagement mechanism may require a user to exert a certain force in order to insert the adapter into the port of the apparatus to engage the snaps. The snap fit engagement mechanism may only allow removal of the adapter from the port of the fiber-optic apparatus through the exertion of a sufficient force in an opposite direction to disengage the snaps. The snap fit engagement mechanism may also only be disengaged when an operator actively disengages the snaps. Such an arrangement prevents the adapter from becoming inadvertently removed from the port of the apparatus. The snap fit engagement mechanism may provide secure engagement which facilitates proper alignment between the adapter and the port of the apparatus. This in turn can help with the proper mating of the ferrules of two connectors received in the adapter. The secure engagement of the adapter in the port of the apparatus also advantageously mitigates external influences in order to reduce or eliminate connection interference problems.

Optionally, the second engagement mechanism is a snap fit engagement mechanism.

Where the second engagement mechanism is a snap fit engagement mechanism, the adapter may be configured to allow a multifiber fiber-optic connector to snap into position in the adapter such that the multifiber fiber-optic connector is engaged with the adapter. The snap fit engagement mechanism may operate by way of snaps and corresponding features for engaging with the snaps. Such a snap fit engagement mechanism may advantageously provide a mechanism which can be engaged and disengaged by an operator working on an apparatus without the need for any specific tooling. This can facilitate access for an operator carrying out routine maintenance on the apparatus or the optical fibers housed within the multifiber fiber-optic connector and/or within the fiber-optic apparatus. The snap fit engagement mechanism may also provide accurate axial location of the multifiber fiber-optic connector relative to the adapter along an axis passing through the center of the internal cavity in the adapter. The snap fit mechanism may also provide accurate longitudinal location of the adapter relative to the multifiber fiber-optic connector. The snap fit engagement mechanism may require a user to exert a certain force in order to insert the multifiber fiber-optic connector into the adapter to engage the snaps. The snap fit engagement mechanism may only allow removal of the multifiber fiber-optic connector from the adapter through the exertion of a sufficient force in an opposite direction to disengage the snaps. The snap fit engagement mechanism may also only be disengaged when an operator actively disengages the snaps. Such an arrangement prevents the multifiber fiber-optic connector from becoming inadvertently removed from the adapter. The snap fit engagement mechanism may provide secure engagement which facilitates proper alignment between the multifiber fiber-optic connector and the adapter. This in turn can help with the proper mating of the ferrules of two connectors received in the adapter. The secure engagement of the multifiber fiber-optic connector in the adapter also advantageously mitigates external influences in order reduce or eliminate connection interference problems.

Optionally, the third engagement mechanism is a threaded engagement mechanism.

Where the third engagement mechanism is a threaded engagement mechanism, the adapter may be configured to allow a hardened multifiber connector to be threaded onto or into the adapter such that the hardened multifiber connector is engaged with the adapter. The threaded engagement mechanism may operate by way of a male thread disposed on one of the hardened multifiber connector or the adapter and a corresponding female thread disposed in or on one of the hardened multifiber connector or the adapter. Such a threaded engagement mechanism may advantageously provide a mechanism which can be engaged and disengaged by an operator working on an apparatus without the need for any specific tooling. This can facilitate access for an operator carrying out routine maintenance on the apparatus or the optical fibers housed within the multifiber fiber-optic connector and/or within the fiber-optic apparatus. The threaded engagement mechanism may also provide accurate axial location of the multifiber fiber-optic connector relative to the adapter along an axis passing through the center of the internal cavity in the adapter. Such an arrangement prevents the hardened multifiber connector from becoming inadvertently removed from the adapter. The threaded engagement mechanism may provide secure engagement which facilitates proper axial alignment between the hardened multifiber connector and the adapter. This in turn can help with the proper mating of the ferrules of two connectors received in the adapter. The secure engagement of the hardened multifiber connector in the adapter also advantageously mitigates external influences in order to reduce or eliminate connection interference problems. The threaded engagement mechanism also advantageously allows for over travel of the hardened multifiber connector when connected to the adapter. This over travel is useful for ensuring proper mating of two ferrules. One or more resilient members, such as springs, arranged in the hardened multifiber connector, the multifiber fiber-optic connector and/or the adapter may compensate for this over travel.

Optionally, the adapter further comprises a shroud that extends beyond the first opening. The shroud may be an extension of the body of the adapter. The shroud may protect the multifiber fiber-optic connector to prevent damage during handling, installation and preparation for attachment to the adapter. The shroud may help to ensure that the multifiber fiber-optic connector is accurately aligned along the long fiber axis and may also serve to bolster the rigidity of the portion of the adapter retaining the connector. The shroud may also prevent the ferrule of the hardened multifiber connector, when it is pre-installed in the adapter from coming into contact with any unwanted portions of the fiber-optic apparatus or the multifiber fiber-optic connector.

Optionally, the shroud has a shape configured to guide the multifiber fiber-optic connector into the first opening. This may facilitate connection of the multifiber fiber-optic connector during installation or routine maintenance. This may also advantageously reduce the likelihood of the ferrule of the hardened multifiber connector becoming damaged as it may be less likely to come into contact with components which are not configured to be guided into the first opening of the adapter. By way of example, the shroud may be generally cylindrical in shape.

Optionally, the shroud comprises at least one opening that extends longitudinally from at least a medial portion of the shroud to the first end of the adapter. The shroud may comprise a pair of openings on opposite sides of the adapter which extend longitudinally from at least a medial portion of the shroud to the first end of the adapter.

Where the shroud is cylindrical and has a pair of openings, the first end of the adapter includes a pair of arcuate shroud portions separated by the openings. The openings may allow space for the first engagement mechanism of the adapter. In particular, the openings in the shroud may provide space for the snaps of the adapter which are configured to engage with the fiber-optic apparatus.

Optionally, the alignment mechanism is an adapter key configured to be received in a slot in the port of the fiber-optic apparatus.

The adapter key may advantageously only allow insertion of the adapter in a port of a fiber-optic apparatus in a single rotational orientation. The adapter key may advantageously allow keyed engagement between the adapter and the fiber-optic apparatus. The adapter key may also allow for exclusion of certain types of fiber-optic apparatus such that the adapter can only be inserted into certain fiber-optic apparatuses. In particular the adapter key may allow the adapter to only be inserted in fiber-optic apparatuses having a corresponding key slot. Once the adapter key is engaged in a corresponding slot of a fiber-optic apparatus, the adapter and the fiber-optic apparatus may be capable of moving in a longitudinal direction relative to one another but rotation of the adapter relative to the fiber-optic apparatus may be prevented. The adapter key may help to isolate and protect the ferrules of two dissimilar connectors received in the adapter from torque on the connected fiber-optic cables. More specifically, rotation of an adapter received in a port of a fiber optic apparatus, in response to torque of one of the cables extending from one of the two connectors may be reduced or even eliminated.

Optionally, the alignment mechanism is a first alignment mechanism and the adapter further comprises a second alignment mechanism for aligning the multifiber fiber-optic connector with respect to the adapter.

The second alignment mechanism may provide a means for aligning the adapter and the multifiber fiber-optic connector. This, in turn facilitates the proper alignment and mating of the ferrules of the multifiber fiber-optic connector and the hardened fiber-optic connector.

Optionally, the second alignment mechanism is a slot in the adapter configured to receive a key on the multifiber fiber-optic connector.

The slot in the adapter may advantageously only allow insertion of the multifiber fiber-optic connector in the adapter in a single rotational orientation. The slot in the adapter may advantageously allow keyed engagement between the adapter and the multifiber fiber-optic connector. The slot in the adapter may also allow for exclusion of certain types of connector such that only certain types of connector can be inserted into the adapter. In particular the slot in the adapter may only allow connectors having a corresponding key to only be inserted in the adapter. Once the slot in the adapter is engaged with a corresponding key of a multifiber fiber-optic connector, the connector and the adapter may be capable of moving in a longitudinal direction relative to one another but rotation of the adapter relative to the fiber-optic apparatus may be prevented. The slot in the adapter may help to isolate and protect the ferrules of two dissimilar connectors received in the adapter from torque on the connected fiber-optic cables. More specifically, rotation a multifiber fiber-optic connector received in a port of an adapter, in response to torque of one of the cables extending from one of the two connectors may be reduced or even eliminated.

Optionally, the adapter further comprises a third alignment mechanism for aligning the hardened multifiber connector with respect to the adapter.

The third alignment mechanism may provide a means for aligning the adapter and the hardened multifiber connector. This in turn facilitates the proper alignment and mating of the ferrules of the multifiber fiber-optic connector and the hardened fiber-optic connector.

Optionally, the adapter key is a first adapter key and the third alignment mechanism is a second adapter key comprised by the adapter and configured to be received in a slot in the hardened multifiber connector.

The second adapter key may advantageously only allow insertion of the hardened multifiber connector in the adapter in a single rotational orientation. The second adapter key may advantageously allow keyed engagement between the adapter and the hardened multifiber connector. The second adapter key may also allow for exclusion of certain types of connector such that only certain types of connector can be inserted into the adapter. In particular the second adapter key may only allow connectors having a corresponding slot to only be inserted in the adapter. Once the second adapter key is engaged with a corresponding slot of a hardened multifiber connector, the connector and the adapter may be capable of moving in a longitudinal direction relative to one another but rotation of the adapter relative to the fiber-optic apparatus may be prevented. The second adapter key may help to isolate and protect the ferrules of two dissimilar connectors received in the adapter from torque on the connected fiber-optic cables. More specifically, rotation of a hardened multifiber connector received in a port of an adapter, in response to torque on one of the cables extending from one of the two connectors may be reduced or even eliminated.

Optionally, the locating feature of the adapter is a protrusion on the inner surface of the cavity of the adapter.

Where the locating feature is a protrusion on the inner surface of the cavity of the adapter, the adapter may act as the fiber optic apparatus would to limit the insertion of the hardened multifiber connector to ensure that the ferrule therein is not damaged but to ensure proper connection with the ferrule of the multifiber fiber-optic connector.

Optionally, the adapter further comprises a first seal configured to seal between the adapter and the fiber-optic apparatus.

Where the adapter comprises a first seal, the adapter may provide a watertight connection between the adapter and the fiber-optic apparatus. The watertight connection may prevent the ingress of water or other debris which could damage components housed in the fiber-optic apparatus.

Optionally, the first seal circumscribes the body of the adapter.

This arrangement can advantageously enable good sealing between the adapter and the fiber-optic apparatus. Providing the seal on an outer surface of the adapter rather than in the port of the fiber-optic apparatus can help to make routine maintenance operations easier for an operator. This is because the seal can be more easily replaced in case of failure. Additionally, the adapter is intended to be replaced more often than a closure, meaning that the seal is replaced more frequently. Where the seal is provided as an integral part of the adapter device, the operations needed to be made by an operator assembling the device in the fiber-optic apparatus are reduced.

Optionally, the adapter further comprises a second seal configured to seal between the adapter and the hardened multi-fiber connector.

Where the adapter comprises a second seal, the adapter may provide a watertight connection between the adapter and the hardened multifiber connector. The watertight connection may prevent the ingress of water or other debris which could damage the ferrule or the fibers housed in the hardened connector.

The second seal may be configured to be received in the second opening of the adapter.

This arrangement can advantageously enable good sealing between the adapter and the hardened multifiber connector. Advantageously, where the seal is provided as an integral part of the adapter device, the operations needed to be made by an operator assembling the hardened multifiber connector are reduced.

Optionally, the multifiber fiber-optic connector is a multifiber push-on (MPO) connector.

Where the multifiber fiber-optic connector is an MPO connector, the multifiber fiber-optic connector advantageously complies with intermateability standards such as IEC 61754-7 and EIA/TIA-604-5, which ensure that compliant connectors and adapters can be intermated and meet a certain level of performance. In addition to intermateability, MPO connectors also meet specific end face geometry parameters defined by the IEX PAS 61755-3-31 standard, including angle of polish, fiber protrusion height and maximum fiber height differential across all fibers in the array and for adjacent fibers. This is further advantageous since if the multifiber fiber-optic connector does not meet these standards, i.e. if the fiber height is exceeded and fibers in the array are not of equal height, some fibers will not achieve proper mating, which can seriously impact insertion loss and return loss of the signal.

Optionally, the multifiber fiber-optic connector is an MTP® connector.

Where the multifiber fiber-optic connector is an MTP® connector, the multifiber fiber optic connector may be fully compliant with MPO standards and engineered with very tight tolerances for improved performance. MTP® advantageously allow the use of ribbonized fiber to achieve very high fiber density.

According to a second aspect, a fiber-optic apparatus is provided, the fiber optic apparatus comprising an adapter as described in relation to the first aspect.

The second aspect may be implemented with any of the features of the first aspect described above.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

As used herein, the term 'MPO connector' refers to an array connector comprised of more than two optical fibers. MPO connectors are typically available with 8, 12, 24 fibers for common data centers and LAN applications. However, other fiber counts are available such as 32, 48, 60 or even 72 fibers, but these are typically used for specialty super high-density multi-fiber arrays in large scale optical switches.

As used herein, the term 'MTP® connector' refers to a registered trademark of US Conec and is a type of commonly used MPO connector.

As used herein, the term 'hardened multifiber connector' refers to a connector which has a connector body which strengthens the end of a fiber-optic cable. Hardened multifiber connectors also typically have water and dust resistant properties, are able to operate in a wide range of temperatures, can withstand substantially greater physical stresses than standard connectors and can often have locking capabilities.

As used herein, the term 'BPEO closure' refers to a type of fiber-optic closure which is available in a range of sizes that can be deployed above grade on a pole or a facade or below grade in a manhole or handhole. These closures can be used for fiber-to-the-home (FTTH) deployments and any type of optical fiber cable deployment in the outside plant. The BPEO closures are very versatile and can accommodate a wide range of fiber-optic splice trays and offer flexible fiber management. BPEO closures are also typically designed to be tool free.

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
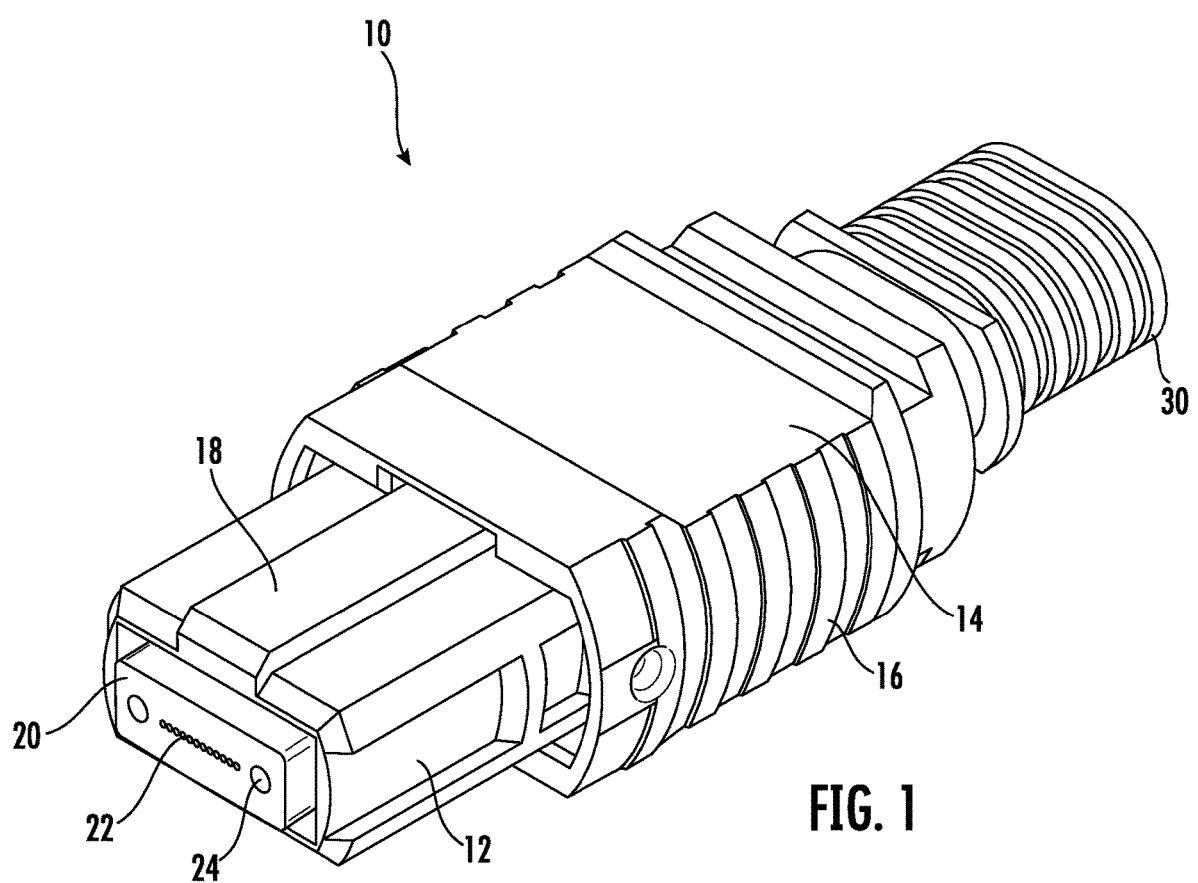
FIG. 1 illustrates a perspective view of an exemplary multifiber fiber-optic connector according to an embodiment.

FIG. 1 illustrates a perspective view of an exemplary multifiber fiber-optic connector according to an embodiment.

Referring to FIG. 1, an example of a conventional MPO connector. The MPO connector 10 is an example of a connector that may be received in a first end of an adapter according to the first aspect. The MPO connector 10 has a generally rectangular cross-section and includes a multifiber ferrule 20 maintained within a ferrule surround portion 12 positioned about ferrule 20. It will be appreciated that the MPO connector may have an alternative cross-section which matches the cross section of an opening of the adapter. The MPO connector 10 further comprises a connector sleeve 14 engaged with the ferrule surround portion 12 and defining a gripping surface 16. The gripping surface 16 may be useful for pulling the sleeve 14 back to reveal the ferrule 20. The gripping surface 16 may also be useful for removing the MPO connector 10 from the adapter 100. The MPO connector 10 further includes an MPO connector key 18 (the key feature 18 may also be referred to as an 'exclusion feature' in some applications) that allows the MPO connector 10 to only be inserted into an appropriate receiver, adapter or connector. The MPO connector 10 may have any number of keys that match one or more slots in the adapter.

The ferrule surround portion 12 protrudes about as far as the end face of the ferrule 20. The ferrule 20 defines guide pin bores 24 and fiber bores 22 for receiving guide pins and optical fibers therein, respectively. Alternatively, the ferrule 20 may have guide pins, instead of guide pin bores, configured to be received in guide pin bores in another ferrule. In the illustrated example MPO connector 10, the ferrule 20 has 12 fiber bores 22. It will be appreciated that in alternative examples the ferrule 20 of the MPO connector may have more or less fiber bores 22. The MPO connector 10 also has a cable boot 30 for retaining a fiber-optic cable in the MPO connector.

Figure 2:
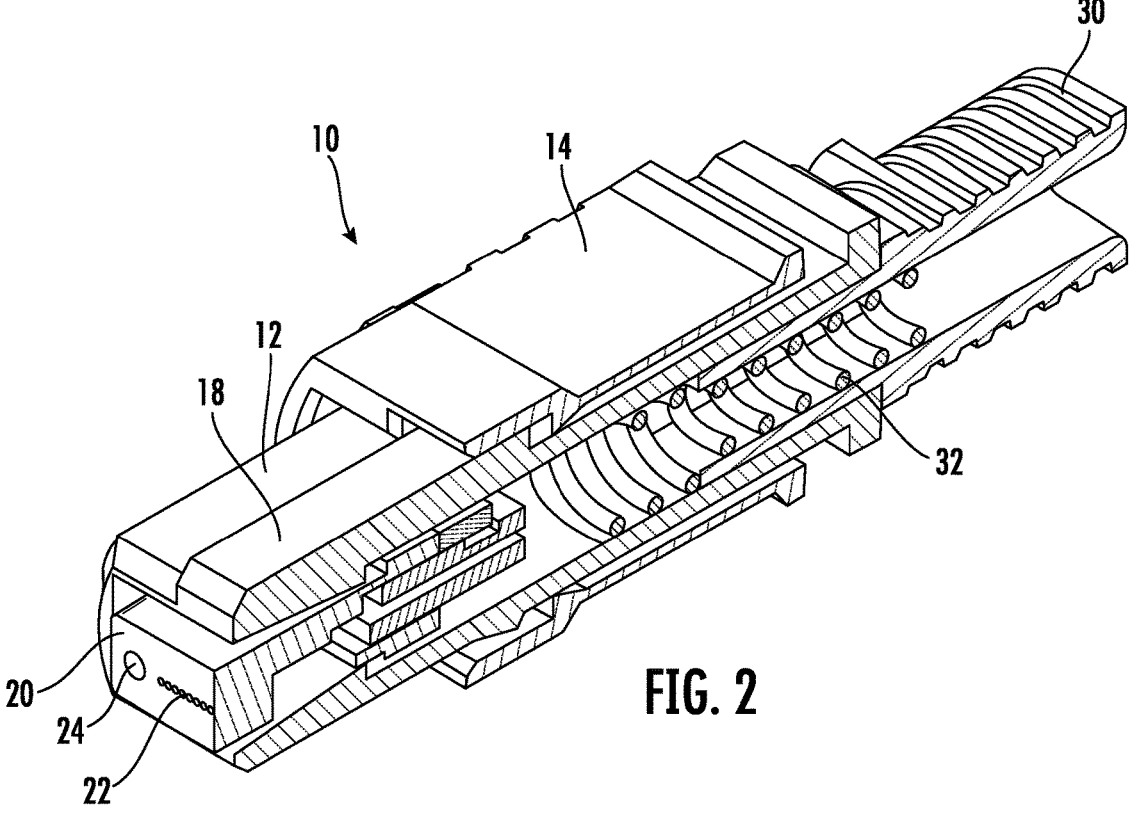
FIG. 2 illustrates a perspective view of side cross section of an exemplary multifiber fiber-optic connector according to an embodiment.

FIG. 2 illustrates a perspective view of side cross section of an exemplary multifiber fiber-optic connector according to an embodiment.

For brevity, features of the MPO connector 10 discussed above in respect of FIG. 1 will not be repeated. As shown in FIG. 2, the MPO connector further comprises a ferrule spring 32 for urging the ferrule 20 towards an engaged position. The ferrule spring 32 may also provide some float in the longitudinal position of the ferrule 20 to ensure there is good contact with a corresponding ferrule in a mating connector without the ferrule 20 being subject to excessive forces.

Figure 3:
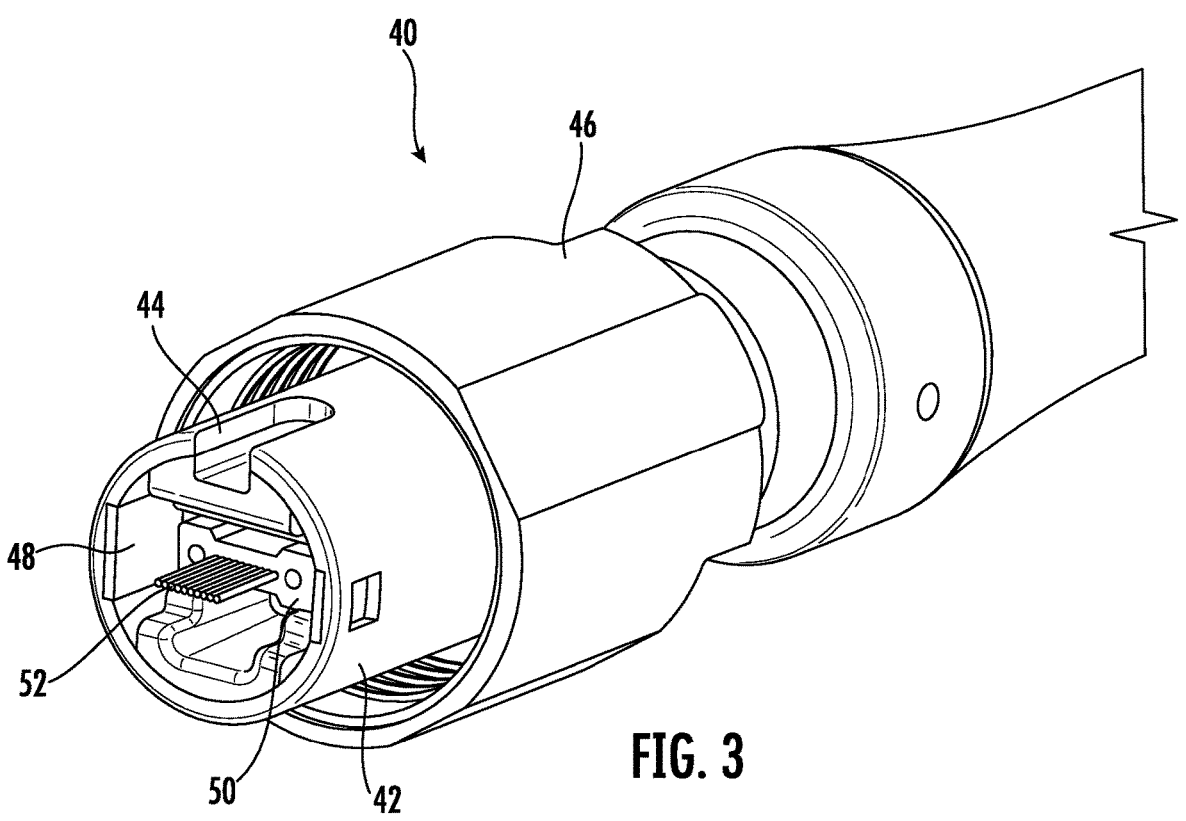
FIG. 3 illustrates a perspective view of an exemplary hardened multifiber connector according to an embodiment.

FIG. 3 illustrates a perspective view of an exemplary hardened multifiber connector according to an embodiment.

Referring to FIG. 3, an example of a conventional hardened multifiber optical connector 40. The connector 40 is an example of a hardened connector that may be received in a second end of an adapter according to a first aspect. The connector 40 includes a multifiber ferrule 50 maintained within a connector housing 42 defining a key slot 44 for ensuring proper mating and mating orientation with the adapter. The connector 40 may have any number of key slots that match one or more keys in the adapter. A threaded coupling nut 46 is positioned about the connector housing 42 and threadably engages an adapter according to the first aspect or another structure to which the connector 40 is engaged. The plug housing 42 defines an internal cavity 48 having a predetermined geometry that may be defined by the connector housing 42 or by an insert received within the connector housing 42. In this view, optical fibers 52 are shown extending from the multifiber ferrule. For the purposes of showing the optical fibers 52, the extent to which the optical fibers 52 extend from the ferrule 50 is exaggerated. It will be appreciated that in use, the optical fibers 52 may not protrude from the ferrule 50 at all, or only protrude from the ferrule 50 by a length in the order of microns. The connector 40 may, for example, be the hardened connector known under the marks "OptiTip™" and "Con2r™" available from Corning Cable Systems of Hickory, N.C.

Figure 4:
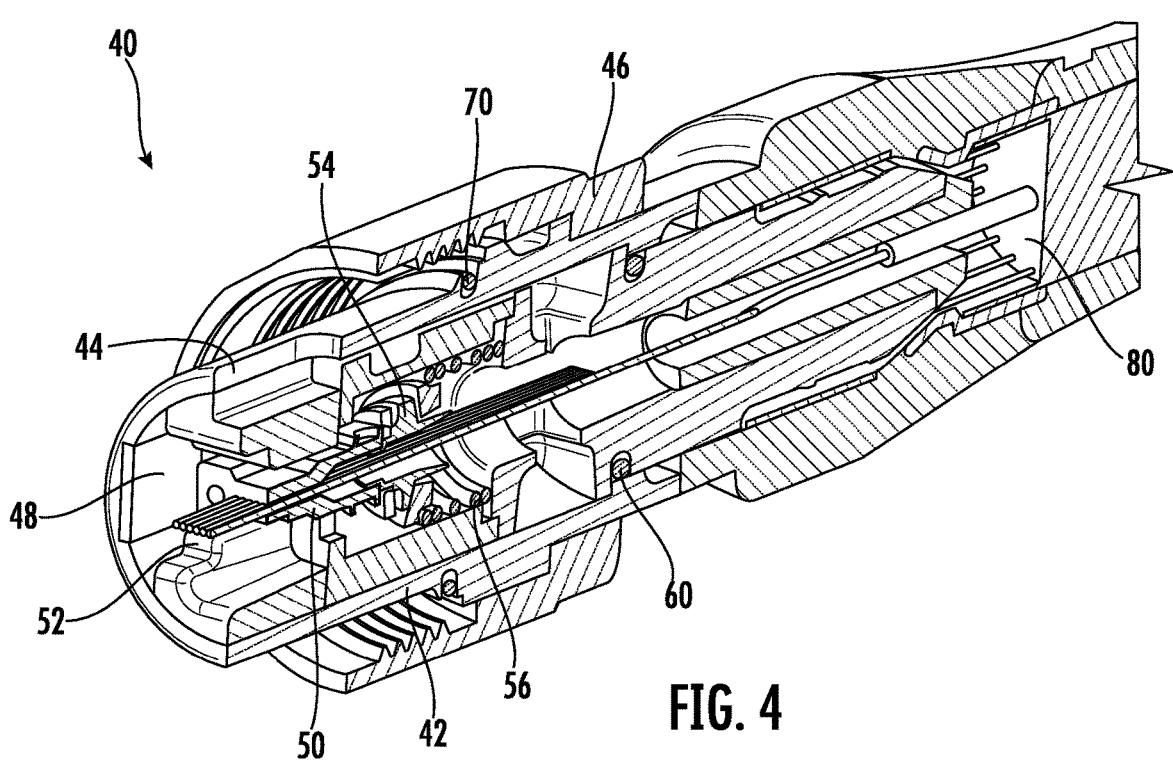
FIG. 4 illustrates a perspective view of a side cross section of an exemplary hardened multifiber connector according to an embodiment.

FIG. 4 illustrates a perspective view of a side cross section of an exemplary hardened multifiber connector according to an embodiment.

For brevity, features of the connector 40 discussed above in respect of FIG. 3 will not be repeated. As shown in FIG. 4, the hardened connector further comprises a first connector seal 60 and a second connector seal 70 for sealing components of the connector. The seals 60, 70 may ensure watertight connections between the different components of the connector which protect the optical fibers housed therein from the ingress of moisture or other debris. The connector also comprises a ferrule boot 54 which guides and protects the optical fibers 52 as they enter the ferrule 50. The connector also includes a ferrule spring 56 for urging the ferrule 50 towards an engaged position. The ferrule spring 56 may also provide some float in the longitudinal position of the ferrule 50 to ensure there is good contact with a corresponding ferrule in a mating connector without the ferrule 50 being subject to excessive forces. FIG. 4 also shows the fiber-optic cable 80 connected to the hardened connector. As with FIG. 3, for the purposes of showing the optical fibers 52, the extent to which the optical fibers 52 extend from the ferrule 50 is exaggerated. It will be appreciated that in use, the optical fibers 52 may not protrude from the ferrule 50 at all, or only protrude from the ferrule 50 by a length in the order of microns.

Figure 5:
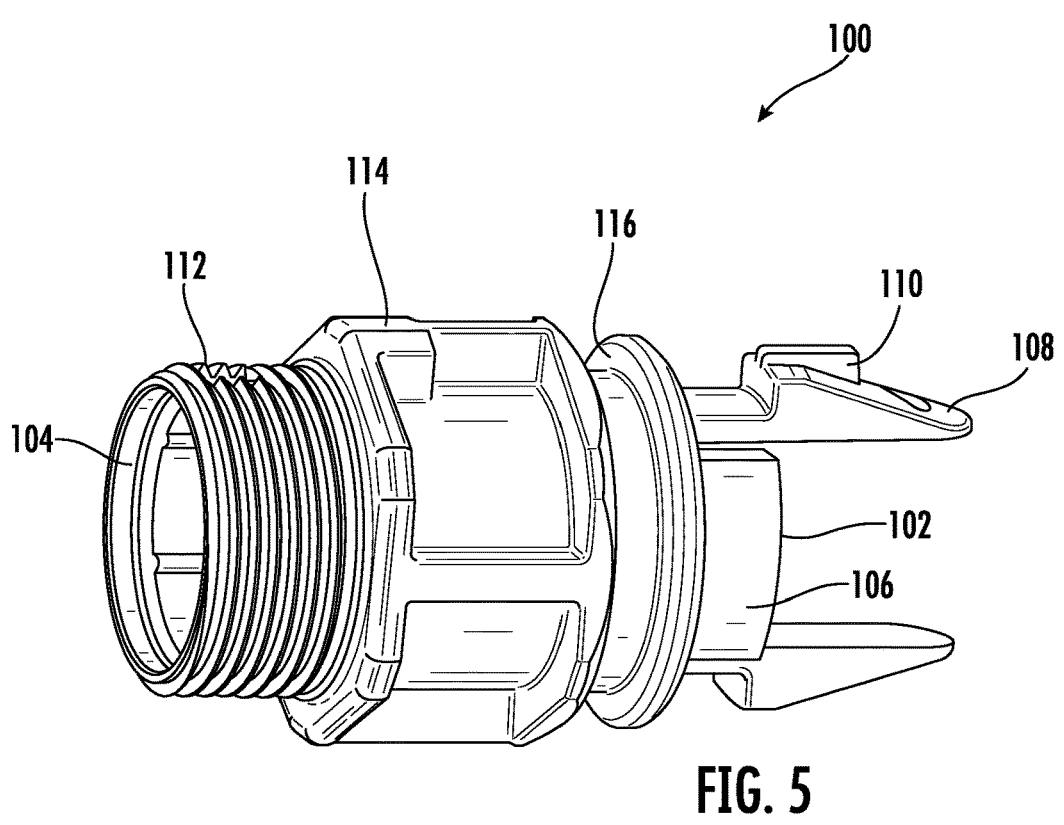
FIG. 5 illustrates a perspective view of an exemplary adapter according to an embodiment with the first seal not shown.

FIG. 5 illustrates a perspective view of an exemplary adapter according to an embodiment with the first seal not shown.

Referring to FIG. 5, the adapter 100 is shown with no connectors connected thereto. The adapter 100 has a body shaped to match the cross-sectional shape of the port of a fiber-optic closure, or any other fiber-optic apparatus. In this embodiment the adaptor has a body shaped to match a hexagonally shaped cross-sectional shape of the port. In particular, the adapter body may be hexagonally shaped. In alternative embodiments, the adapter body may have a rectangular or cylindrical shaped body to match the cross-sectional shape of the port of the fiber-optic closure, depending on the shape of the port. The adapter 100 has a first opening 102 at a first end and a second opening 104 at a second end. The openings 102, 104 are joined to define a cavity or passage which extends from the first end of the adapter to the second end of the adapter. The adapter includes a shroud 106 that extends beyond the opening 102 in the adapter 100. Features of the shroud will be described in more detail in respect of FIG. 6. The adapter 100 further comprises an engagement mechanism which is a snap fit engagement mechanism in the form of snaps 108, which are configured to engage with a port of a fiber-optic closure when the adapter 100 is inserted in the port of the closure. In this example embodiment, the adapter 100 comprises two snaps 108 which are spaced at 180 degrees from each other around the first opening 102 of the adapter 100. It will be appreciated that in alternative embodiments, the aforementioned engagement mechanism may be a threaded engagement, press fit engagement or any other form of suitable engagement mechanism. Alternative embodiments may further have only a single snap 108 or more than two snaps 108 which may be evenly or unevenly spaced around the first opening 102 of the adapter 100. As can be seen in this example, one of the snaps 108 of the adapter 100 has a first alignment mechanism for aligning the adapter 100 with the fiber-optic apparatus. The first alignment mechanism is in the form of a first adapter key 110 configured to be received in a corresponding slot in the port of the fiber optic closure. The adapter 100 may also have more than one key 110 located on two or more snaps 108. The one or more keys 110 ensure that the adapter 100 is inserted in the fiber-optic closure in one or more specific orientations. It will be appreciated that alternative adapter 100 embodiments may have no key 110 such that the adapter can be inserted in the port of a fiber-optic closure in any orientation. Alternatively, the one or more keys 110 may be located on other components of the adapter 100 such as the body of the adapter or the shroud 106. As shown in FIG. 114, the adapter 100 has an optional visual indicator 114 of the key position. This visual indicator 114 may allow a user to correctly install the adapter 100 in the correct orientation. The adapter further includes an engagement mechanism in the form of a thread 112 located at the second end of the adapter 100. The thread 112 is a male thread on an outer surface of the adapter 100 and is configured to engage with a corresponding female thread in a portion of hardened multifiber connector, such as the threaded coupling nut 46. It will be appreciated that in alternative embodiments, the engagement mechanism for engaging the adapter 100 with a hardened multifiber connector may be an alternative type of engagement mechanism such as a push/pull mechanism or a bayonet mechanism. The adapter of the embodiment of FIG. 5 is shown without the first seal. The adapter of FIG. 5 is configured to have an O-ring mounted in the O-ring groove 116 of the adapter 100. In alternative embodiments, an O-ring may be preinstalled in the O-ring groove 116 of the adapter 100. In alternative embodiments, the adapter 100 may not have an O-ring groove 116 as the seal for sealing between the adapter 100 and the fiber-optic closure may be located in the port of the fiber-optic closure.

Figure 6:
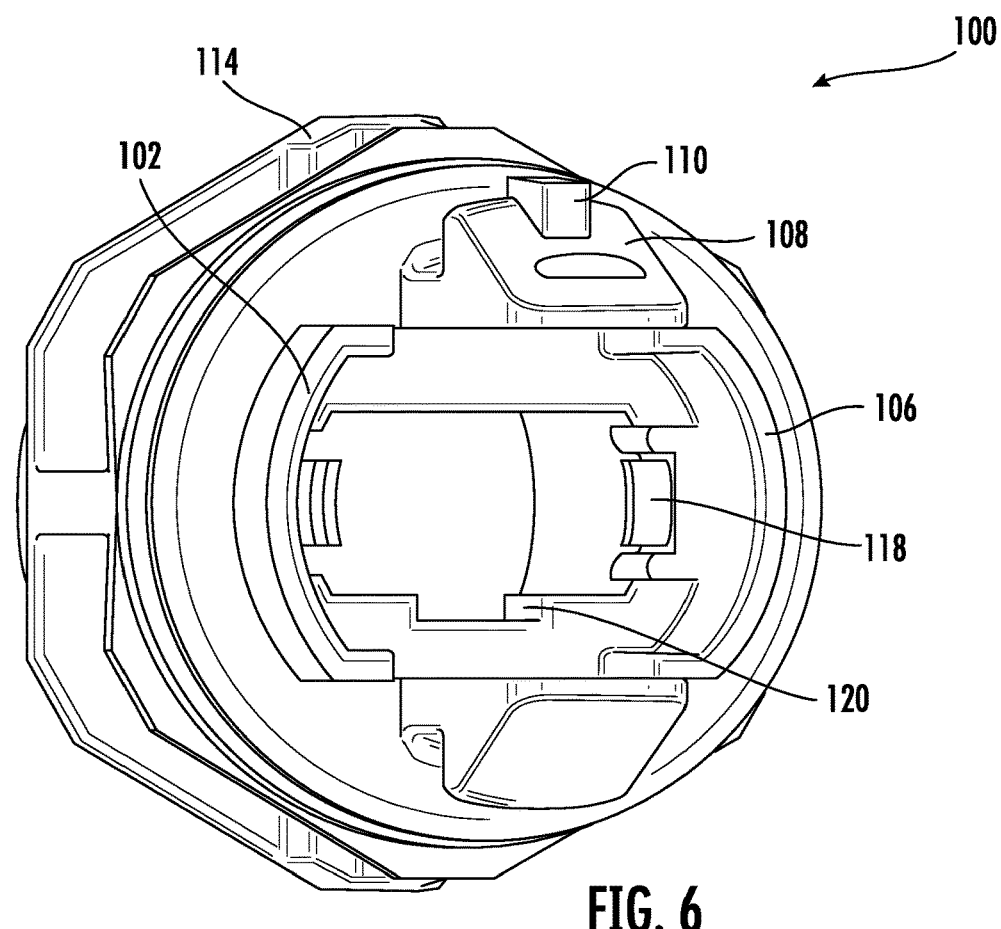
FIG. 6 illustrates a perspective view of the first end of an exemplary adapter according to an embodiment with the first seal not shown.

FIG. 6 illustrates a perspective view of the first end of an exemplary adapter 100 according to an embodiment with the first seal not shown.

For brevity, features of the adapter 100 discussed above in respect of FIG. 5 will not be repeated. Referring to FIG. 6, the shroud 106 of the adapter 100 is integral with the adapter and is an extension of the first end of the adapter body. In this embodiment the shroud 106 is cylindrical in shape and is formed of two arcuate shroud portions separated by two openings at opposite sides of the opening 102 in the first end of the adapter 100. The snaps 108 extend from the first end of the adapter 100 in the openings between the arcuate shroud portions. The snaps 108 are also located concentrically with the openings in the shroud 106. In alternative embodiments of the adapter 100, the shroud 106 may have a different shape which conforms with the outer profile of a multifiber fiber-optic connector. Alternative arrangements of the shroud 106 are also envisioned in which the shroud 106 includes only one or more than two arcuate shroud portions. Furthermore, in some embodiments, the snaps 108 may not be arranged concentrically with the shroud 106. As can be seen in FIG. 6, the adapter 100 also has a second alignment mechanism for aligning the adapter 100 and the MPO connector 10. The second alignment mechanism is in the form of a slot 120 in the cavity of the adapter 100, configured to receive a corresponding key on the MPO connector 10. The adapter 100 may also have more than one slot 120 in the cavity of the adapter configured to receive two or more keys on the MPO connector 10. The one or more slots 120 ensure that the MPO connector 10 is inserted in the adapter 100 in one or more specific orientations. It will be appreciated that alternative adapter 100 embodiments may have no slot 120 such that an MPO connector 10 can be inserted in the adapter 100 in any orientation. The adapter further comprises a further engagement mechanism between the first end of the adapter 100 and the second end of the adapter 100 for engaging with an MPO connector 10 inserted in the first opening 102 in the adapter 100. This engagement mechanism may be in the form of a snap fit engagement mechanism with snaps 118, which are configured to engage with a an MPO connector when it is inserted in the cavity of the adapter 100. In this example embodiment, the adapter 100 comprises two snaps 118 which are spaced at 180 degrees from each other around the cavity of the adapter 100. It will be appreciated that in alternative embodiments, the aforementioned engagement mechanism may be a threaded engagement, press fit engagement or any other form of suitable engagement mechanism. Alternative embodiments may further have only a single snap 118 or more than two snaps 118 which may be evenly or unevenly spaced around the cavity of the adapter 100.

Figure 7:
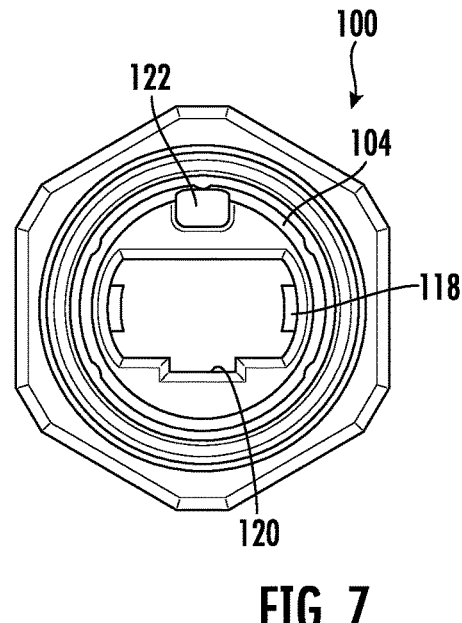
FIG. 7 illustrates an end view of the second end of an exemplary adapter according to an embodiment.

FIG. 7 illustrates an end view of the second end of an exemplary adapter according to an embodiment.

For brevity, features of the adapter 100 discussed above in respect of FIGS. 5 and 6 will not be repeated. As illustrated in FIG. 7, the second opening 104 of the adapter 100 has a circular cross-section. However, other embodiments of the adapter are envisaged in which the cross-section of the second opening of the adapter 100 has an alternative shape which matches the outer profile of a hardened multifiber connector configured to be received in the second opening 104 of the adapter. As can be seen in this example, the adapter 100 has a second alignment mechanism in the cavity of the adapter 100, for aligning a hardened connector 40 with the adapter 100. The second alignment mechanism is in the form of a second adapter key 122 configured to be received in the corresponding slot 44 in the hardened connector. The adapter 100 may also have more than one key 122 located in the cavity of the adapter 100. The one or more keys 122 ensure that the hardened connector is inserted in the adapter 100 in one or more specific orientations. It will be appreciated that alternative adapter 100 embodiments may have no key 122 such that the adapter 100 can be inserted in the adapter 100 in any orientation.

Figure 8:
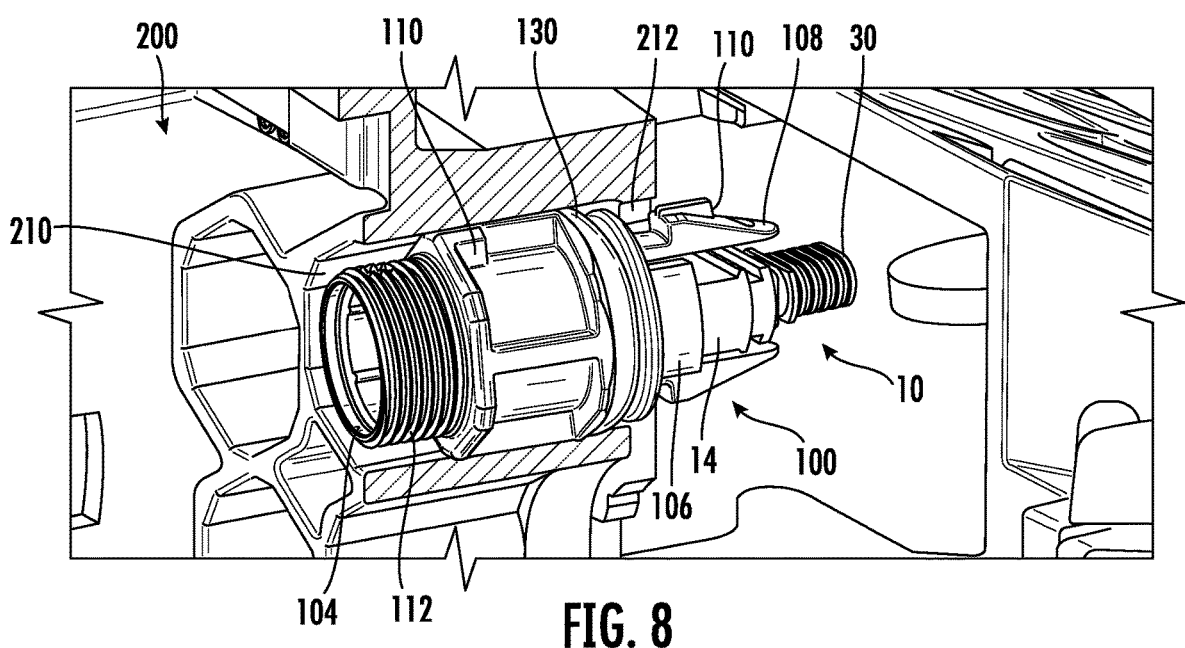
FIG. 8 illustrates a perspective view of a partially sectioned exemplary assembly comprising an exemplary adapter, according to an embodiment, received in a port of an exemplary fiber-optic apparatus, with an exemplary multifiber fiber-optic connector received in the first end of the adapter.

FIG. 8 illustrates a perspective view of a partially sectioned exemplary assembly comprising an exemplary adapter 100, according to an embodiment, received in a port 210 of an exemplary fiber-optic apparatus 200, with an exemplary multifiber fiber-optic connector 10 received in the first end of the adapter.

For brevity, features of the adapter 100 and the multifiber fiber-optic connector 10 discussed above in respect of FIGS. 1 to 7 will not be repeated. In FIG. 8, a BPEO sectioned closure 200 is shown having a number of hexagonal ports 210 configured to receive fiber-optic connectors and adapters according to the first aspect. This Figure shows an exemplary adapter 100 received in one of the hexagonal ports 210 of the BPEO closure 200 with an MPO connector 10 received in the first opening 102 of the adapter. As will be appreciated by one of skill in the art, alternative embodiments of the adapter 100 may be received in fiber-optic closure ports with different cross-sectional shapes depending on the shape of the body of the adapter 100. As shown in FIG. 8, the port 210 of the BPEO closure 200 has a slot 212 through which the key 110 on the snap 108 of the adapter has passed in order for the snaps 108 of the adapter key 110 to engage with the BPEO closure 200. The adapter is shown with O-ring 130 installed in the O-ring groove 116 in order to seal between the adapter 100 and the BPEO closure 200.

Figure 9:
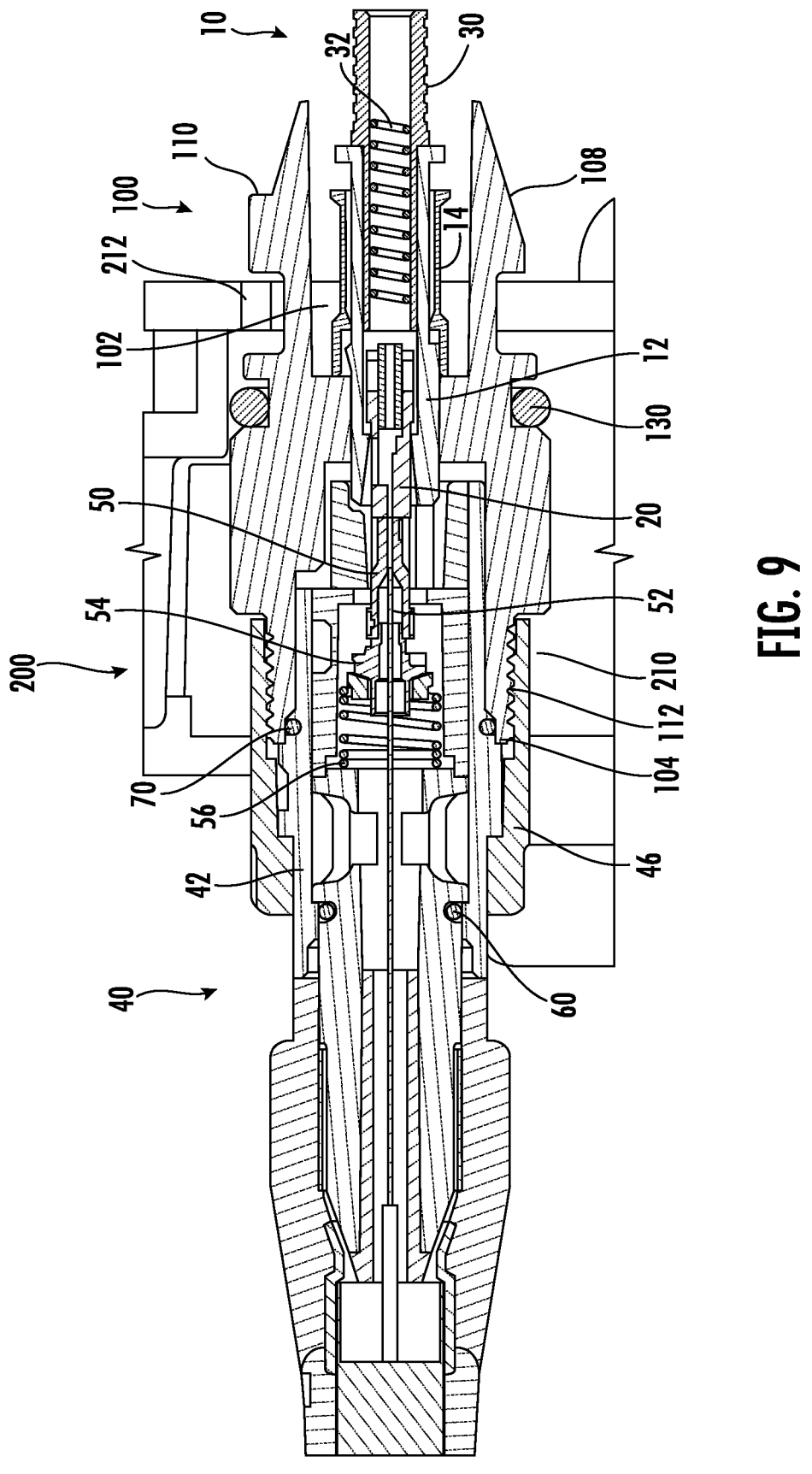
FIG. 9 illustrates a side cross section of an exemplary assembly comprising an exemplary adapter according to an embodiment, the adapter received in an exemplary fiber-optic apparatus and having an exemplary multifiber fiber-optic connector received in the first end of the adapter and an exemplary hardened multifiber connector received in the second end of the adapter.

FIG. 9 illustrates a side cross section of an exemplary assembly comprising an exemplary adapter 100 according to an embodiment, the adapter 100 received in an exemplary fiber-optic apparatus 200 and having an exemplary multifiber fiber-optic connector 10 received in the first opening 102 of the adapter 100 and an exemplary hardened multifiber connector 40 received in the second opening 104 of the adapter 100.

For brevity, features of the adapter 100, the multifiber fiber-optic connector 10 and the hardened multifiber connector 40 discussed above in respect of FIGS. 1 to 8 will not be repeated. Referring to FIG. 9, the adapter 100 is shown received in a port 210 of a BPEO closure 200, with an MPO connector 10 received in the first opening 102 of the adapter 100 and a hardened connector 40 received in the second opening 104 in the adapter 100. FIG. 9 also shows precise alignment and contact between the ferrule 20 and ferrule 50 of the MPO connector 10 and the hardened connector 40 respectively.

As used herein, the terms "fiber-optic cables" and/or "optical fibers" include all types of single mode and multi-mode light waveguides, including one or more optical fibers that may be uncoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

It is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An adapter for a fiber-optic plug, the adapter configured to be received in a port of a fiber-optic apparatus, the adapter comprising:

a first opening proximate a first end of the adapter, the first opening configured to receive a multifiber fiber optic connector;

a second opening proximate a second end of the adapter, the second opening configured to receive a hardened multifiber connector;

an adapter body extending longitudinally between the first end of the adapter and the second end of the adapter and defining an internal cavity therethrough, the adapter body comprising:

a first engagement mechanism at the first end of the adapter for engaging with the port of the fiber-optic apparatus;

a second engagement mechanism between the first end of the adapter and the second end of the adapter for engaging with the multifiber fiber optic connector;

a third engagement mechanism at the second end of the adapter for engaging with a hardened multifiber connector;

a locating feature for locating the hardened multifiber connector in the adapter; and an alignment mechanism for aligning the adapter with the fiber-optic apparatus, wherein the alignment mechanism is a first alignment mechanism and the adapter further comprises a second alignment mechanism for aligning the multifiber fiber-optic connector with respect to the adapter, wherein the second alignment mechanism is a slot in the adapter configured to receive a key on the multifiber fiber-optic connector, wherein the adapter further comprises a third alignment mechanism for aligning the hardened multifiber connector with respect to the adapter, wherein the adapter key is a first adapter key; and wherein the third alignment mechanism is a second adapter key comprised by the adapter and configured to be received in a slot in the hardened multifiber connector.

2. An adapter according to claim 1, wherein the adapter is configured to be received in the port of the fiber-optic closure.

3. An adapter according to claim 1, wherein the adapter is configured to be received in a hexagonal port of a fiber-optic closure.

4. An adapter according to claim 1, wherein the adapter is configured to be received in a port of a BPEO closure.

5. An adapter according to claim 1, wherein the first engagement mechanism is a snap fit engagement mechanism.

6. An adapter according to claim 1, wherein the second engagement mechanism is a snap fit engagement mechanism.

7. An adapter according to claim 1, wherein the third engagement mechanism is a threaded engagement mechanism.

8. An adapter according to claim 1, further comprising a shroud that extends beyond the first opening.

9. An adapter according to claim 8, wherein the shroud has a shape configured to guide the multifiber fiber-optic connector into the first opening.

10. An adapter according to claim 8, wherein the shroud comprises at least one opening that extends longitudinally from at least a medial portion of the shroud to the first end of the adapter.

11. An adapter according to claim 1, wherein the alignment mechanism is an adapter key configured to be received in a slot in the port of the fiber-optic apparatus.

12. An adapter according to claim 1, wherein the locating feature of the adapter is a protrusion on the inner surface of the cavity of the adapter.

13. An adapter according to claim 1, wherein the adapter further comprises a first seal configured to seal between the adapter and the fiber-optic apparatus.

14. An adapter according to claim 13, wherein the first seal circumscribes the body of the adapter.

15. An adapter according to claim 1, wherein the adapter further comprises a second seal configured to seal between the adapter and the hardened multi-fiber connector.

16. An adapter according to claim 15, wherein the second seal is configured to be received in the second opening of the adapter.

* * * * *